United States Patent
Chuong et al.

(10) Patent No.: US 9,206,742 B2
(45) Date of Patent: Dec. 8, 2015

(54) PASSAGES TO FACILITATE A SECONDARY FLOW BETWEEN COMPONENTS

(71) Applicant: United Technologies Corporation, Hartford, CT (US)

(72) Inventors: Conway Chuong, Manchester, CT (US); Matthew Budnick, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 378 days.

(21) Appl. No.: 13/730,891

(22) Filed: Dec. 29, 2012

(65) Prior Publication Data

US 2014/0245751 A1 Sep. 4, 2014

(51) Int. Cl.
*F02C 7/20* (2006.01)
*F01D 25/24* (2006.01)
*F01D 11/14* (2006.01)
*F01D 25/12* (2006.01)
*F01D 25/16* (2006.01)
*F01D 25/28* (2006.01)
*F01D 25/26* (2006.01)

(52) U.S. Cl.
CPC . *F02C 7/20* (2013.01); *F01D 11/14* (2013.01); *F01D 25/12* (2013.01); *F01D 25/162* (2013.01); *F01D 25/243* (2013.01); *F01D 25/265* (2013.01); *F01D 25/28* (2013.01); *Y02T 50/675* (2013.01)

(58) Field of Classification Search
CPC ........... F02C 7/20; F01D 25/28; F01D 25/12; F01D 25/162; F01D 25/243; F01D 25/26; F01D 25/265; F01D 11/14; F01D 11/20; F01D 11/24; F01D 11/025; Y02T 50/675

USPC ............. 60/796, 798; 277/412, 418; 415/115, 415/213.1, 214.1, 220

See application file for complete search history.

(56) References Cited

U.S. PATENT DOCUMENTS

| | | | |
|---|---|---|---|
| 2,124,108 A | 7/1938 | Grece | |
| 3,576,328 A | 4/1971 | Vose | |
| 3,736,069 A | * 5/1973 | Beam et al. ................... | 415/115 |
| 3,970,319 A | 7/1976 | Carroll et al. | |
| 4,088,422 A | 5/1978 | Martin | |
| 4,114,248 A | 9/1978 | Smith et al. | |
| 4,478,551 A | 10/1984 | Honeycutt, Jr. et al. | |
| 4,635,332 A | 1/1987 | Cederwall et al. | |
| 4,645,217 A | 2/1987 | Honeycutt, Jr. et al. | |

(Continued)

FOREIGN PATENT DOCUMENTS

| | | |
|---|---|---|
| EP | 0487193 A1 | 5/1992 |
| WO | 2009108084 A1 | 9/2009 |

OTHER PUBLICATIONS

International Searching Authority, PCT Notification of Transmittal of the International Search Report and the Written Opinion, Apr. 18, 2014, 9 pages.

*Primary Examiner* — Phutthiwat Wongwian
*Assistant Examiner* — Alain Chau
(74) *Attorney, Agent, or Firm* — Kinney & Lange, P.A.

(57) ABSTRACT

An annular mount for a gas turbine engine includes a first flange and a second flange. The first flange has an arcuate shape, and the second flange extends from the first flange. The second flange has an interface surface along at least one side and has a plurality of mounting apertures extending therethrough. The channels extend along a length of the interface surface from a first edge to a second edge.

19 Claims, 8 Drawing Sheets

(56) References Cited

U.S. PATENT DOCUMENTS

| | | |
|---|---|---|
| 4,678,113 A | 7/1987 | Bridges et al. |
| 4,738,453 A | 4/1988 | Ide |
| 4,756,536 A | 7/1988 | Belcher |
| 4,920,742 A | 5/1990 | Nash et al. |
| 4,987,736 A | 1/1991 | Ciokajlo et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,541 A | 5/1993 | Fledderjohn et al. |
| 5,236,302 A | 8/1993 | Weisgerber et al. |
| 5,246,295 A | 9/1993 | Ide |
| 5,273,397 A | 12/1993 | Czachor et al. |
| 5,289,677 A | 3/1994 | Jarrell |
| 5,338,154 A | 8/1994 | Meade et al. |
| 5,370,402 A | 12/1994 | Gardner et al. |
| 5,385,409 A | 1/1995 | Ide |
| 5,401,036 A | 3/1995 | Basu |
| 5,474,305 A | 12/1995 | Flower |
| 5,558,341 A | 9/1996 | McNickle et al. |
| 5,593,277 A * | 1/1997 | Proctor et al. ............. 415/173.1 |
| 5,632,493 A | 5/1997 | Gardner |
| 5,755,445 A | 5/1998 | Arora |
| 5,911,400 A | 6/1999 | Niethammer et al. |
| 5,961,279 A | 10/1999 | Ingistov |
| 6,196,550 B1 | 3/2001 | Arora et al. |
| 6,343,912 B1 | 2/2002 | Manteiga et al. |
| 6,352,404 B1 * | 3/2002 | Czachor et al. ............... 415/116 |
| 6,364,316 B1 | 4/2002 | Arora |
| 6,439,841 B1 | 8/2002 | Bosel |
| 6,601,853 B2 | 8/2003 | Inoue |
| 6,619,030 B1 | 9/2003 | Seda et al. |
| 6,637,751 B2 | 10/2003 | Aksit et al. |
| 6,638,013 B2 | 10/2003 | Nguyen et al. |
| 6,652,229 B2 | 11/2003 | Lu |
| 6,736,401 B2 | 5/2004 | Chung et al. |
| 6,805,356 B2 | 10/2004 | Inoue |
| 6,811,154 B2 | 11/2004 | Proctor et al. |
| 6,935,631 B2 | 8/2005 | Inoue |
| 6,983,608 B2 | 1/2006 | Allen, Jr. et al. |
| 6,997,673 B2 * | 2/2006 | Morris et al. ...................... 415/1 |
| 7,025,565 B2 * | 4/2006 | Urso et al. ................. 415/173.5 |
| 7,094,026 B2 | 8/2006 | Coign et al. |
| 7,185,499 B2 * | 3/2007 | Chereau et al. ................. 60/796 |
| 7,238,008 B2 | 7/2007 | Bobo et al. |
| 7,246,993 B2 * | 7/2007 | Bolms et al. ................... 415/116 |
| 7,367,567 B2 | 5/2008 | Farah et al. |
| 7,371,044 B2 | 5/2008 | Nereim |
| 7,631,879 B2 | 12/2009 | Diantonio |
| 7,735,833 B2 | 6/2010 | Braun et al. |
| 7,798,768 B2 | 9/2010 | Strain et al. |
| 8,069,648 B2 | 12/2011 | Snyder et al. |
| 8,083,465 B2 | 12/2011 | Herbst et al. |
| 8,152,451 B2 | 4/2012 | Manteiga et al. |
| 8,221,071 B2 | 7/2012 | Wojno et al. |
| 8,245,518 B2 | 8/2012 | Durocher et al. |
| 8,727,705 B2 * | 5/2014 | Inomata et al. ................ 415/117 |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2005/0046113 A1 | 3/2005 | Inoue |
| 2010/0047077 A1 | 2/2010 | Daniels |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0307165 A1 | 12/2010 | Wong et al. |
| 2011/0000223 A1 | 1/2011 | Russberg |
| 2011/0027068 A1 * | 2/2011 | Floyd et al. ...................... 415/13 |
| 2011/0214433 A1 | 9/2011 | Feindel et al. |
| 2011/0262277 A1 | 10/2011 | Sjoqvist et al. |
| 2012/0023968 A1 * | 2/2012 | Shteyman et al. ............... 60/796 |
| 2012/0111023 A1 | 5/2012 | Sjoqvist |
| 2012/0192567 A1 * | 8/2012 | Rice et al. ........................ 60/772 |

\* cited by examiner

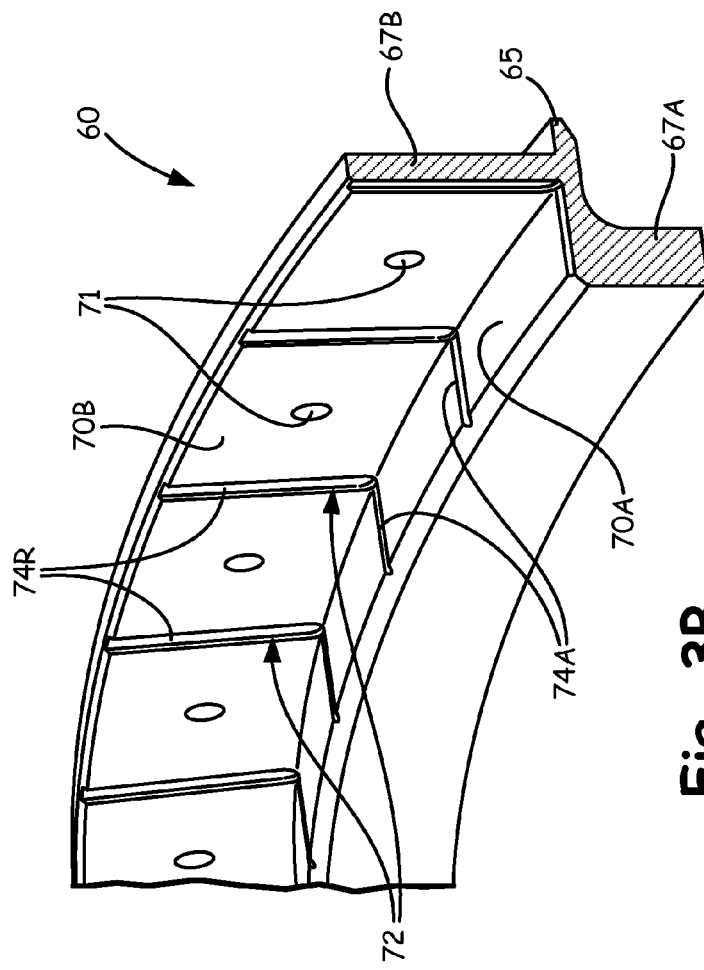
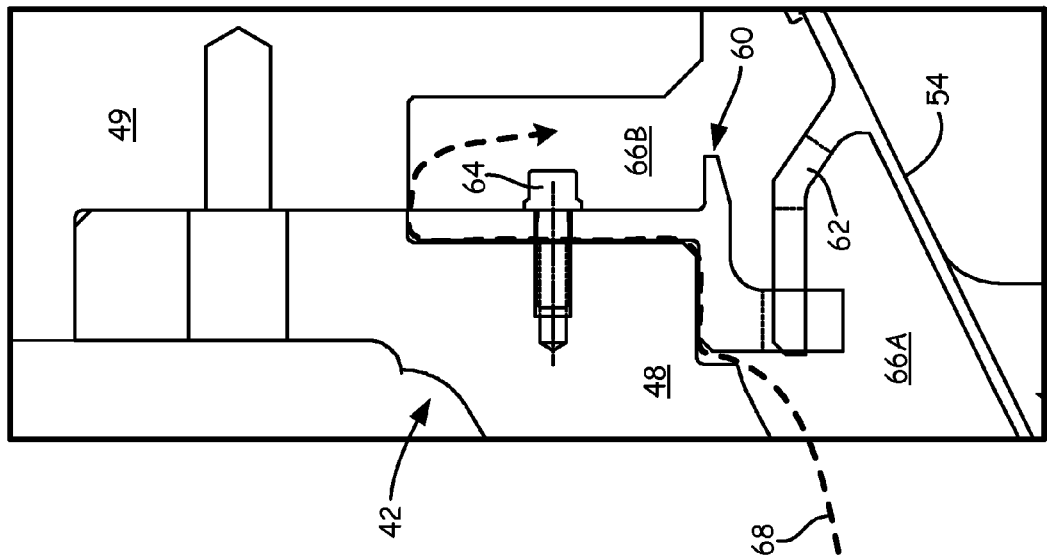
Fig. 3B
Fig. 3A

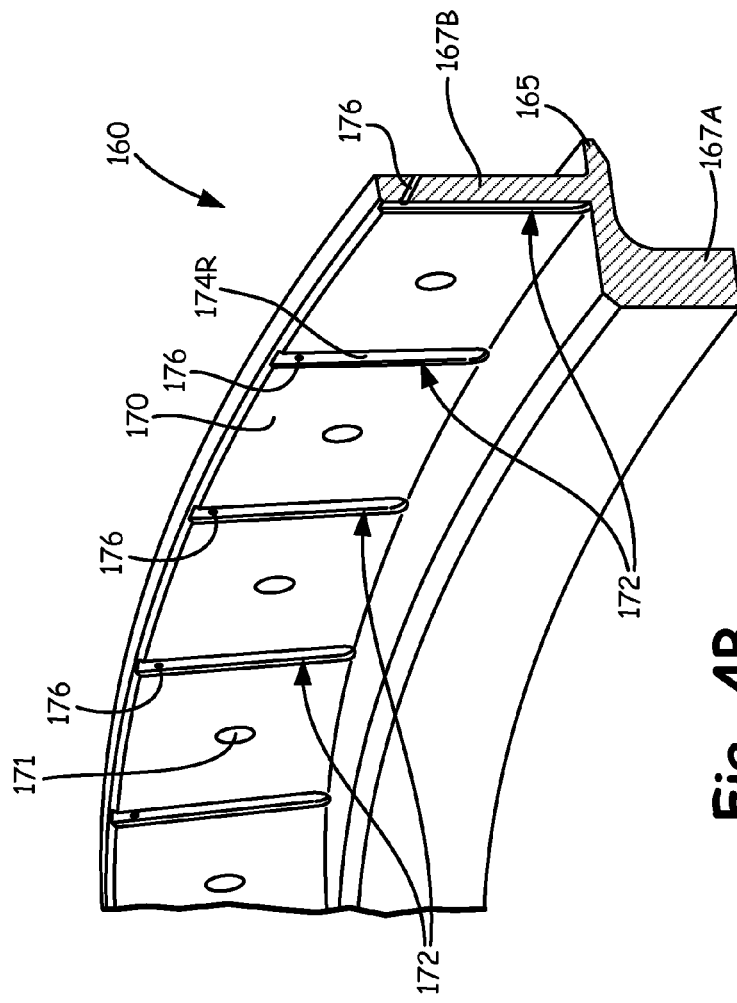
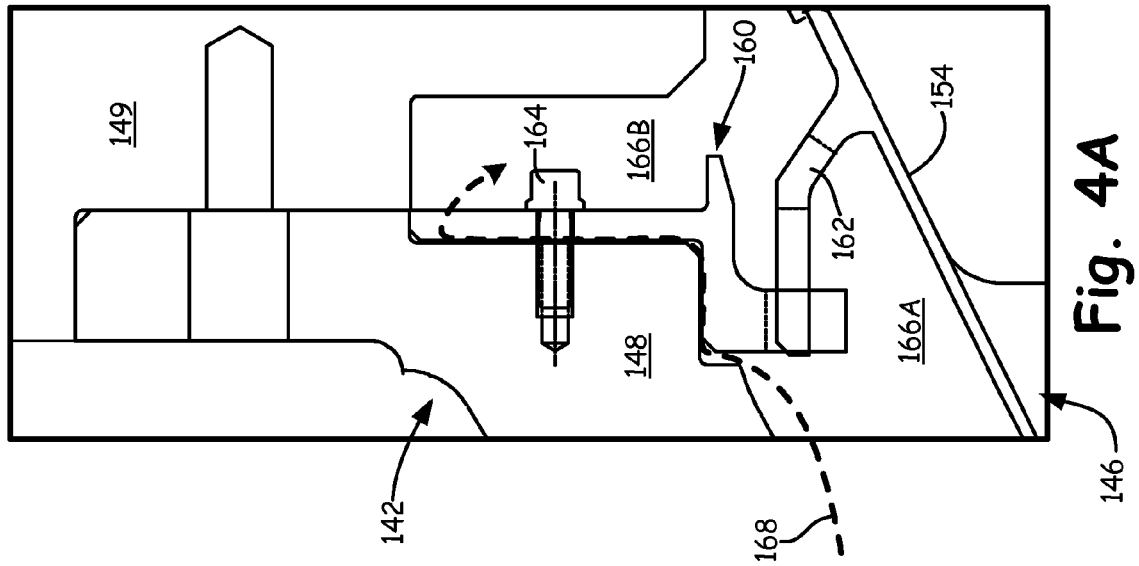
Fig. 4B
Fig. 4A

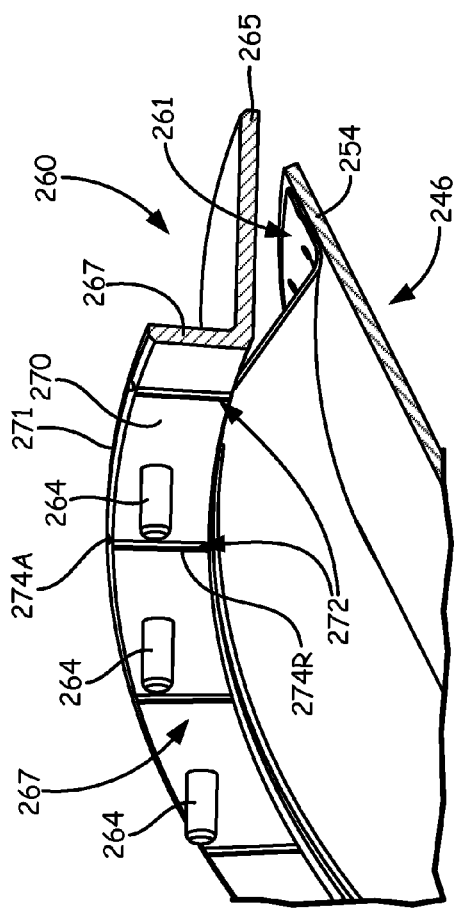
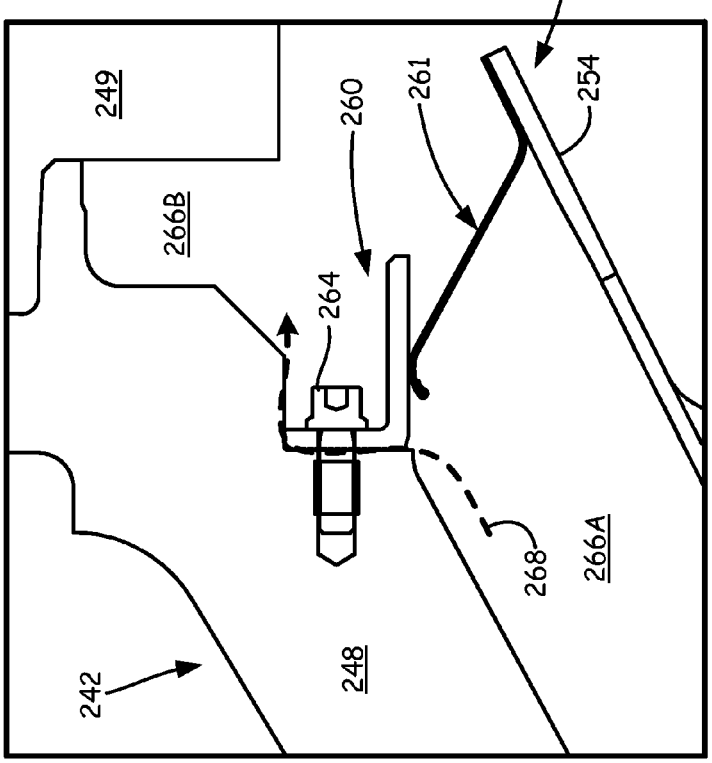
Fig. 5B
Fig. 5A

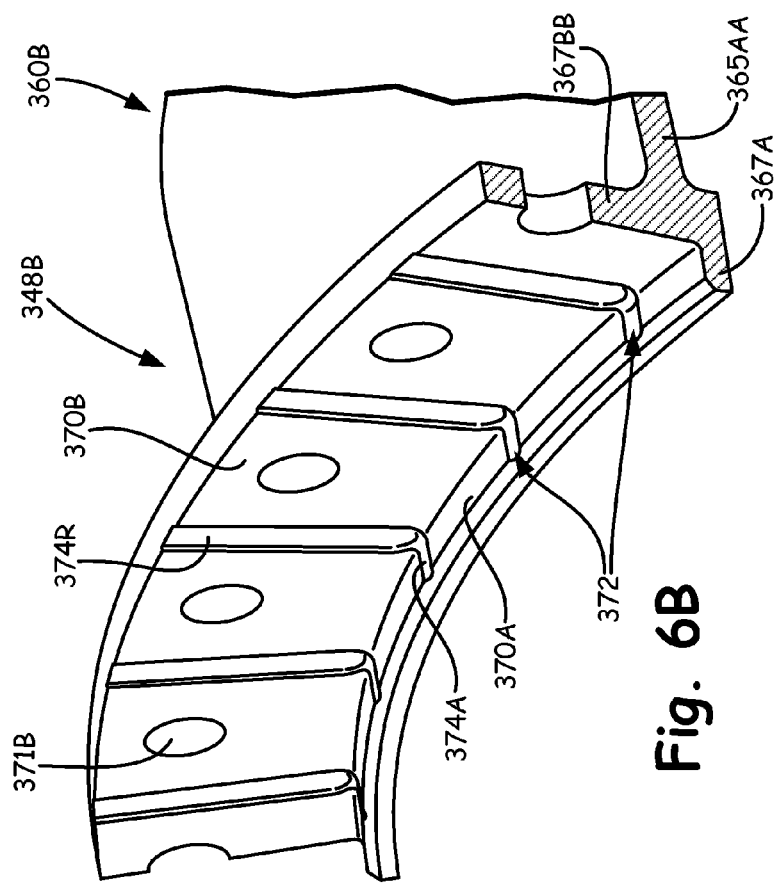
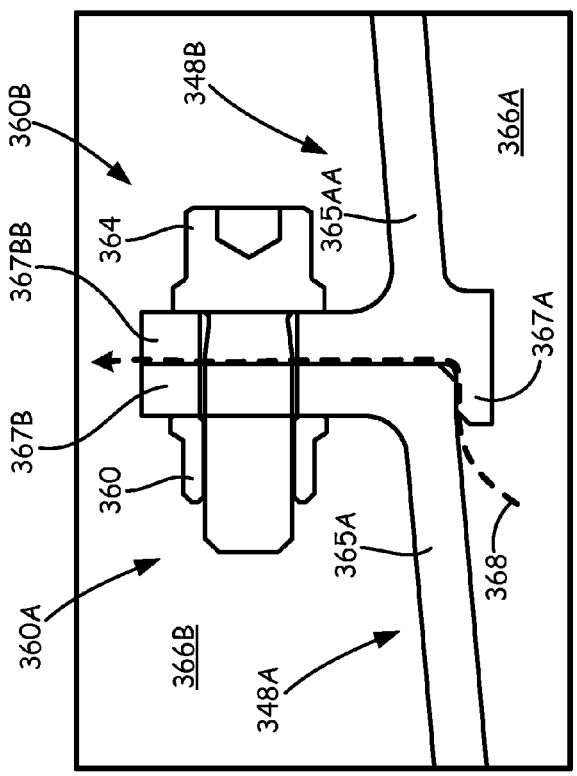
Fig. 6B
Fig. 6A

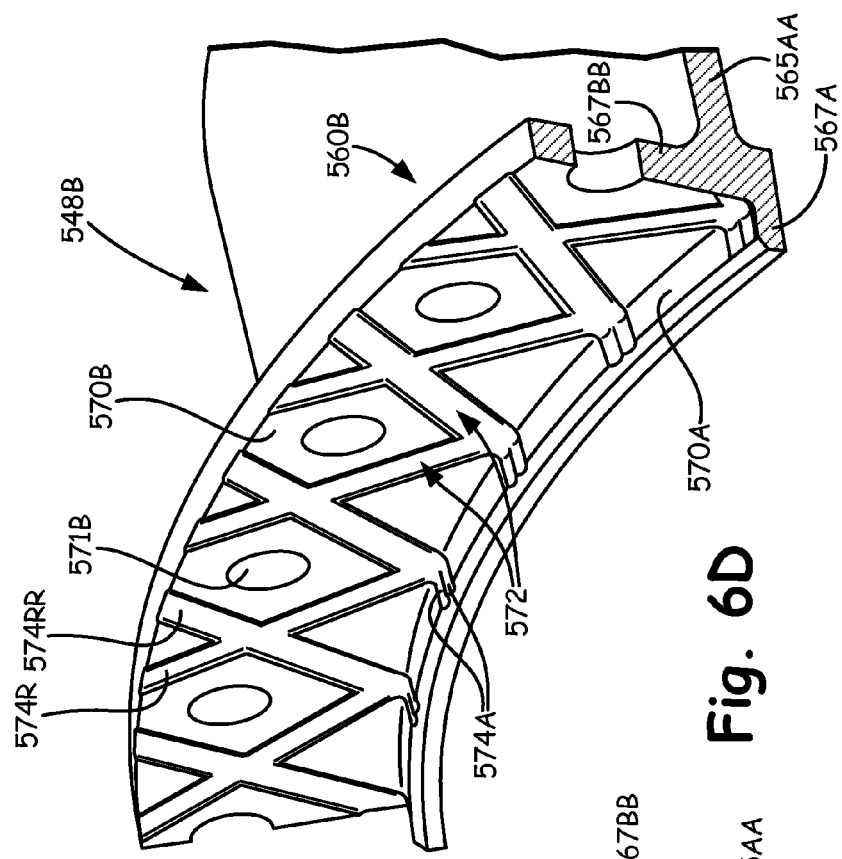
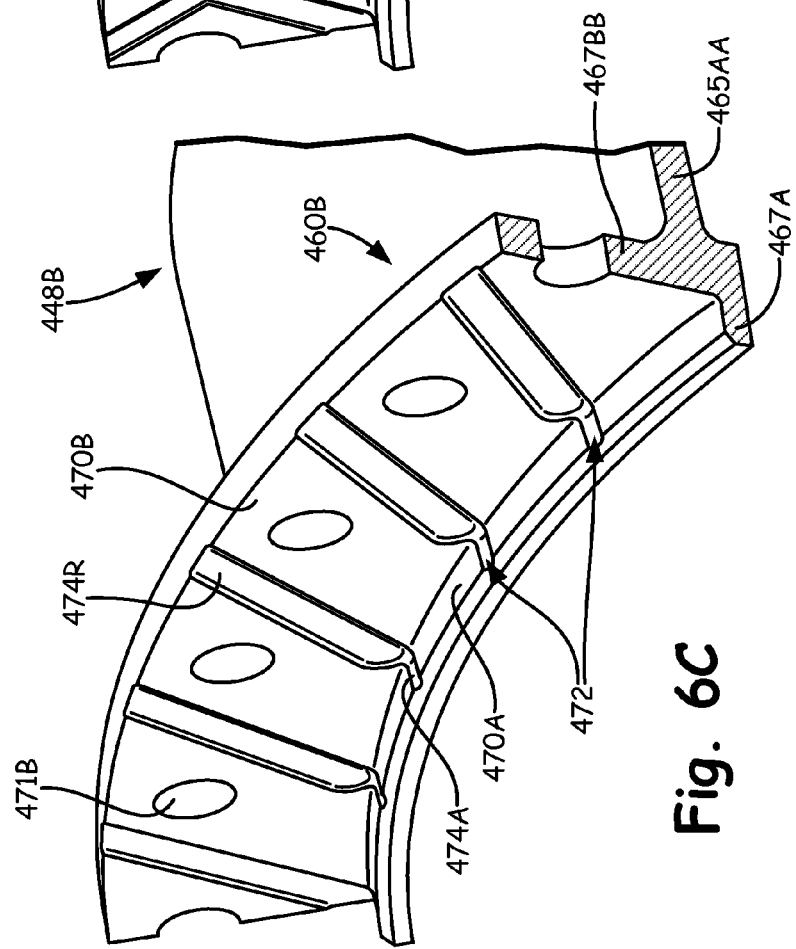

PASSAGES TO FACILITATE A SECONDARY FLOW BETWEEN COMPONENTS

BACKGROUND

The invention relates to gas turbine engines, and more particularly to the purging of cavities and the film cooling of components within gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Components such as finger seals are used in gas turbine engines and seal off cavities from one another. In some instances, these cavities may become dead spaces filled with relatively warm stagnant air that is not desirable.

SUMMARY

An annular mount for a gas turbine engine includes a first flange and a second flange. The first flange has an arcuate shape, and the second flange extends from the first flange. The second flange has an interface surface along at least one side and has a plurality of mounting apertures extending therethrough. The channels extend along a length of the interface surface from a first edge to a second edge.

An assembly for a gas turbine engine includes a first casing and an annular mount. The first casing has a mounting surface, and the annular mount has a surface that interfaces and mates with the mounting surface. The surface of the annular mount has a plurality of channels extending therealong that allow for the passage of a secondary gas flow between the annular mount and the first casing.

A turbine section for a gas turbine engine includes a first casing, a fairing, and an annular mount. The first casing extends along the turbine section and has an aft surface. The fairing is disposed within the first casing to form a main gas flow path. The first casing and fairing together form a first cavity disposed forward of the aft surface. The annular mount is disposed at a radial distance from the fairing and has a radially extending second flange that interfaces and mates with the aft surface. The second flange has a plurality of channels extending along a surface thereof that allow for the passage of a secondary gas flow from the first cavity to a second cavity.

BRIEF DESCRIPTION OF THE DRAWINGS

FIG. 3A is an enlarged cross-sectional view of one embodiment of the annular mount with passages that allow for cooling flow to a cavity.

FIG. 3B is a perspective view of the annular mount of FIG. 3A with the passages illustrated.

FIG. 4A is an enlarged cross-sectional view of another embodiment of the annular mount and passages.

FIG. 4B is a perspective view of the annular mount of FIG. 4A with the passages illustrated.

FIG. 5A is a cross-sectional view of yet another embodiment of the annular mount with passages and a finger seal.

FIG. 5B is a perspective view of the annular mount of FIG. 5A and the finger seal.

FIG. 6A is a cross-sectional view of another embodiment of the annular mount with passages, the annular mount disposed between two casings.

FIG. 6B is a perspective view of the annular mount of FIG. 6A showing one embodiment with generally radially extending passages.

FIG. 6C is a perspective view of the annular mount of FIG. 6A showing another embodiment with clocked passages.

FIG. 6D is a perspective view of the annular mount of FIG. 6A showing another embodiment with crossed passages.

DETAILED DESCRIPTION

The invention discloses the use of annular mounts with channels therealong (and in some embodiments impingement holes) to a direct secondary air flow for purging dead cavities within gas turbine engines. Additionally, the channels in the annular mount can be used to provide a cooling air flow along a surface of a component that the annular mount is mounted to, as well as providing a cooling air to the cavities.

Figure 1:
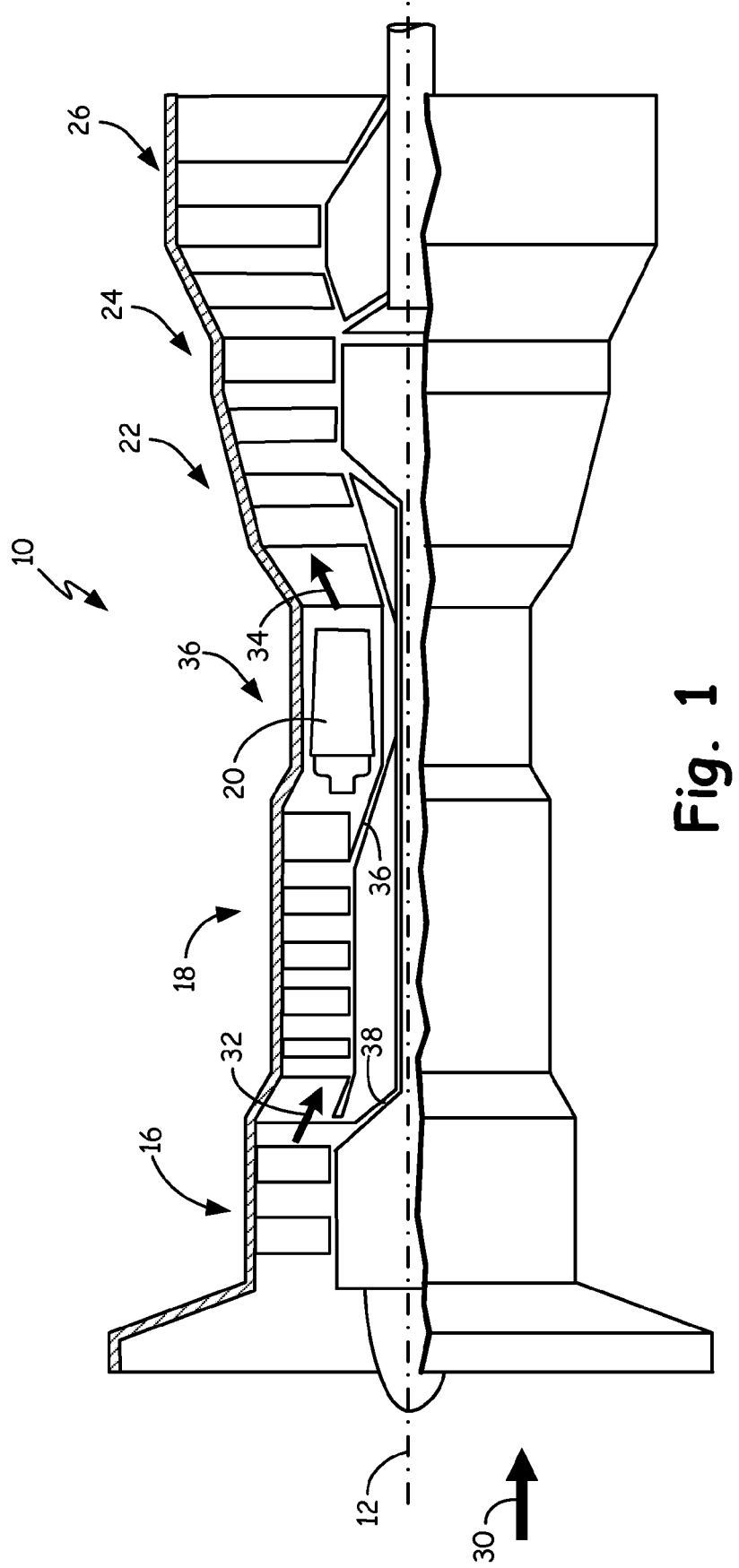
FIG. 1 is an industrial turbine cross-section.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2A:
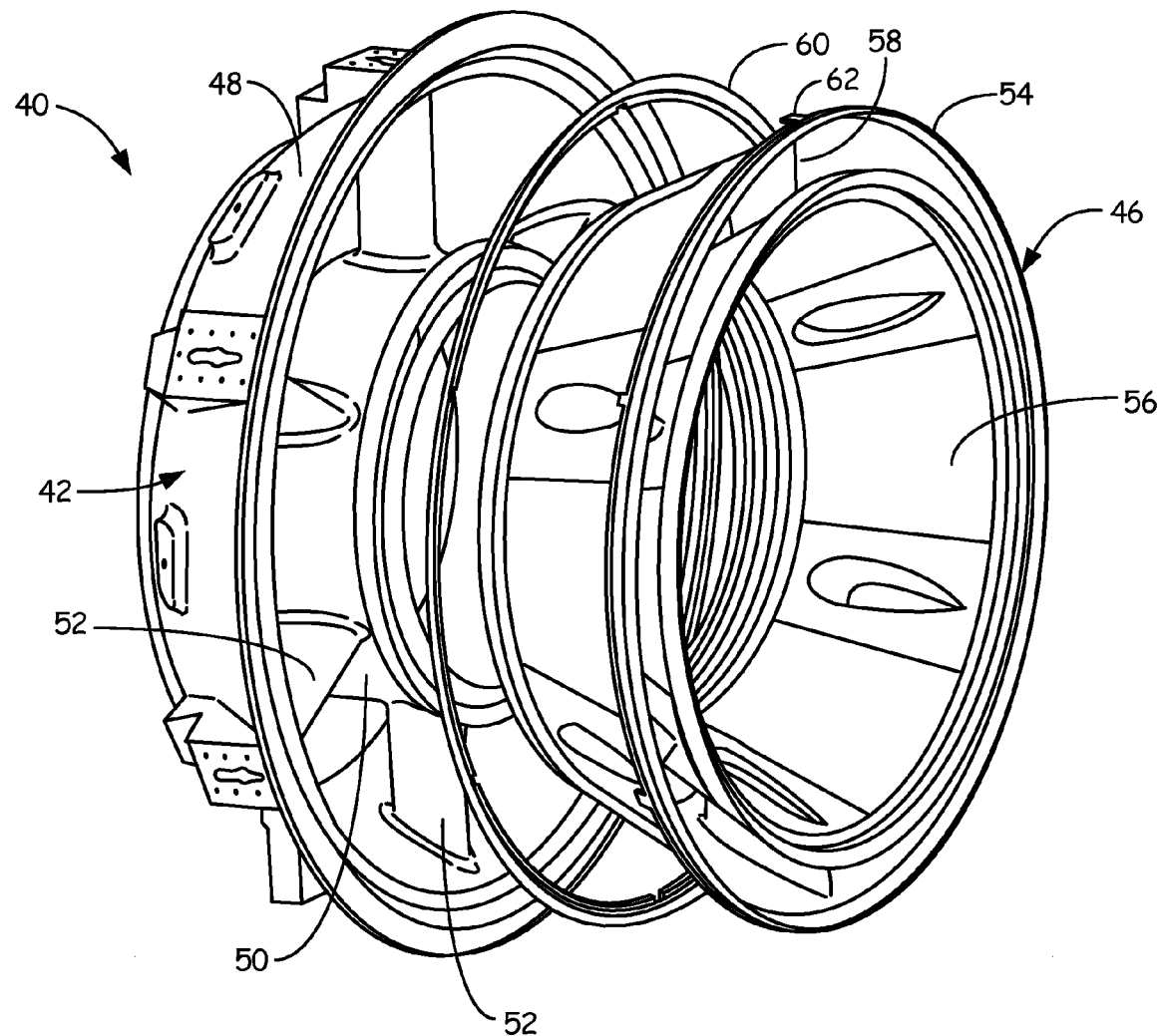
FIG. 2A is an exploded view of an assembly including a fairing, an annular mount, and a frame.
Figure 2B:
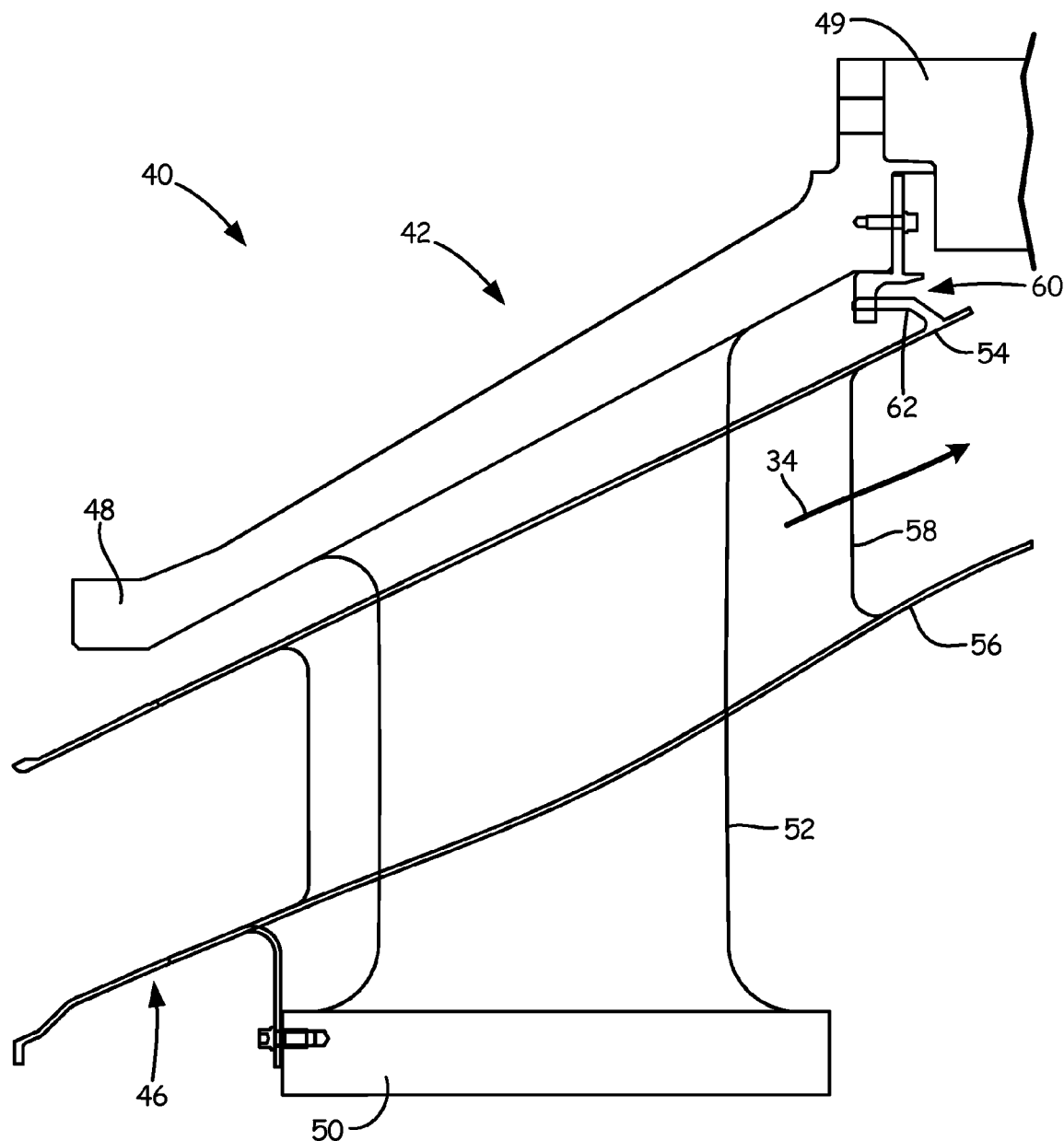
FIG. 2B is a cross-section of the assembly including a fairing, an annular mount, and a frame arranged together.

FIG. 2A shows an exploded view of assembly 40 with frame 42, fairing 46, and annular mount 60. FIG. 2B shows a cross-section of assembly 40 with annular mount 60 installed along an aft end of outer radial casing 48 of frame 42. Assembly 40 includes frame 42, fairing 46, and annular mount 60. Frame 42 includes outer radial casing 48, inner radial casing 50, and struts 52. Fairing 46 includes outer radial platform 54, inner radial platform 56, strut liners 58, and stiffening rib 62.

Frame 42 comprises a stator component of gas turbine engine 10 (FIG. 1) and can form portions of compressor sections 16 and 18 and/or turbine sections 22 and 24. Fairing 46 is connected to the frame 42 when installed. Additionally, when installed fairing 46 is disposed within the frame 42 to form the main gas flow path for a portion of gas turbine engine 10 through which combustion gases 34 can flow.

As illustrated in FIGS. 2A and 2B, outer radial casing 48 of frame 42 is conically shaped and forms a portion of the casing of gas turbine engine 10 (FIG. 1), for example, in high pressure turbine section 22. Inner radial casing 50 is disposed generally radially inward of outer radial casing 48 and is connected thereto by struts 52.

Fairing 46 is adapted to be disposed within frame 42 between outer radial casing 48 and inner radial casing 50. Outer radial platform 54 of fairing 46 has a generally conical shape. Stiffening rib 62 extends from an aft end of outer radial platform 54. Inner radial platform 56 has a generally conical shape. Inner radial platform 56 is spaced from outer radial platform 54 by strut liners 58. Strut liners 58 are adapted to be disposed around struts 52 of frame 42 when fairing 46 is assembled on frame 42. As discussed previously, outer radial platform 54, inner radial platform 56, and strut liners 58, form the main gas flow path for a portion of gas turbine engine 10 when assembled.

Outer radial casing 48 abuts and is affixed to a second outer radial casing 49 of another module of gas turbine engine 10 (FIG. 1). In the embodiment of FIGS. 2A and 2B, annular mount 60 is mounted to an aft end of outer radial casing 48 adjacent second outer radial casing 49.

Annular mount 60 acts to separate cavities within gas turbine engine 10. Annular mount 60 comprises a component that is mounted to or is integral with other components of gas turbine engine 10 (FIG. 1) and is used for various purposes. In the embodiment shown in FIG. 2B, annular mount 60 acts as a mount ring that interacts with stiffening rib 62 to retain fairing 46 along an aft end thereof. In other embodiments, annular mount 60 can comprise a seal land that interfaces and makes contact with various seals. In yet other embodiments, annular mount 60 can comprise an attachment feature that connects two components such as two casings together.

FIG. 3A shows an enlarged cross-sectional view of one embodiment of annular mount 60 mounted to frame 42. FIG. 3B shows a perspective view of annular mount 60 with passages 72 extending along interface surfaces 70A and 70B. In addition to frame 42, fairing 46, outer radial casing 48, second outer radial casing 49, outer radial platform 54, annular mount 60, and stiffening rib 62, FIG. 3A shows fasteners 64 (only on is shown in FIG. 3A), first cavity 66A, second cavity 66B, and secondary flow 68. In FIG. 3A, annular mount 60 is used as a mount ring to interact with stiffening rib 62 to limit deflection of fairing 46. In FIG. 3B, annular mount 60 includes first flange 65, shoulder 67A, second flange 67B, first interface surface 70A, second interface surface 70B, mounting apertures 71, and passages 72. Passages 72 include first channels 74A and second channels 74R.

As shown in FIG. 3A, annular mount 60 is mounted to outer radial casing 48 by fasteners 64. First cavity 66A is disposed between outer radial platform 54 and outer radial casing 48. Second cavity 66B is disposed between an aft portion of outer radial casing 48 and a forward portion of second outer radial casing 49. Annular mount 60 can act along with a seal (not shown) to separate first cavity 66A from second cavity 66B. Secondary air flow 68 travels around seal (not shown) and annular mount 60 between outer radial casing 48 and annular mount 60 via passages 72 (FIG. 3B). Thus, secondary air flow 68 travels from first cavity 66A to second cavity 66B.

Annular mount 60 extends circumferentially with respect to the centerline axis 12 (FIG. 1) of gas turbine engine 10. In FIG. 3B, first flange 65 has an arcuate shape and extends axially from shoulder 67A. Second flange 67B also has an arcuate shape and extends radially from shoulder 67A. Shoulder 67A includes first interface surface 70A while second flange 67B includes second interface surface 70B and mounting apertures 71. Passages 72 extend along first interface surface 70A and second interface surface 70B. Mounting apertures 71 extend through second flange 67A and are interposed between passages 72. Mounting apertures 71 are adapted to receive fasteners 64 (FIG. 3A) to mount annular mount 60 to outer radial casing 48.

Passages 72 are comprised of first channels 74A and second channels 74R. First channels 74A extend generally axially along first interface surface 70A and second channels 74R extend generally radially along second interface surface 70B. First channels 74A communicate with second channels 74R to allow for the passage of secondary air flow 68.

First interface surface 70A and second interface surface 70B are adapted to interface with and generally conform to the shape of the aft end of outer radial casing 48. First channels 74A receive secondary air flow 68 at a first edge of first interface surface 70A and communicate the secondary air flow 68 to second channels 74R. Secondary air flow 68 passes along second channels 74R at a second edge of second interface surface 70B and exits second channels 74R along an outer radial extent of second flange 67A. In another embodiment, exit holes can be formed along second channels 74R to relieve potential over cooling and/or provide for additional cooling for annular mount 60.

Passages 72 allow for air flow between first cavity 66A and second cavity 66B. Thus, first cavity 66A and second cavity 66B can be purged with a continuous air flow. Additionally, passages 72 allow air flow to film cool the aft surface of outer radial casing 48 to which annular mount 60 is mounted. Providing film cooling increases the operation life of outer radial casing 48, and can allow for less expensive materials to be used if temperatures are reduced adequately.

FIG. 4A shows an enlarged cross-sectional view of another embodiment of annular mount 160 mounted to frame 142. FIG. 4B shows a perspective view of annular mount 160 with passages 172 extending along and from interface surface 170. In addition to frame 142, fairing 146, outer radial casing 148, second outer radial casing 149, outer radial platform 154, annular mount 160, and stiffening rib 162, FIG. 4A shows fasteners 164 (only on is shown in FIG. 4A), first cavity 166A, second cavity 166B, and secondary flow 168. FIG. 4B shows a portion of annular mount 160, which comprises a mount ring. Annular mount 160 includes first flange 165, shoulder 167A, second flange 167B, interface surface 170, mounting apertures 171, and passages 172. Passages 172 include channels 174 and impingement holes 176.

As shown in FIG. 4A, annular mount 160 is mounted to outer radial casing 148 by fasteners 164. First cavity 166A is disposed between aft end of outer radial platform 154 and forward end of outer radial casing 148. Second cavity 166B is disposed between outer radial casing 148 and second outer radial casing 149. Annular mount 160 and stiffening rib 162 separate first cavity 166A from second cavity 166B. Secondary air flow 168 travels between outer radial casing 148 and annular mount 160 via passages 172 (FIG. 4B). Thus, secondary air flow 168 travels from first cavity 166A to second cavity 166B.

Annular mount extends circumferentially with respect to the centerline axis 12 (FIG. 1) of gas turbine engine 10. In FIG. 4B, first flange 165 has an arcuate shape and extends axially from shoulder 167A. Second flange 167B also has an arcuate shape and extends radially from shoulder 167A. Second flange 167B includes interface surface 170 and mounting apertures 171. Passages 172 extend along interface surface 170A and through second flange 167. Mounting apertures 171 extend through second flange 167B and are interposed between passages 172. Mounting apertures 171 are adapted to receive fasteners 164 (FIG. 4A) to mount annular mount 160 to outer radial casing 148.

Passages 172 are comprised of channels 174R and impingement holes 176. Channels 174R extend generally radially along interface surface 170. Impingement holes 176 extend through second flange 167B. Channels 174R communicate with impingement holes 176 to allow for the passage of secondary air flow 168.

Interface surface 170 is adapted to interface with and generally conform to the shape of the aft end of outer radial casing 48. Channels 174B receive secondary air flow 168 and communicate secondary air flow 168 to impingement holes 176. Secondary air flow 168 passes through impingement holes 176 and exits second flange 167B along an opposing side from interface surface 170.

FIG. 5A shows an enlarged cross-sectional view of yet another embodiment of annular mount 260 mounted to frame 242. FIG. 5B shows a perspective view of annular mount 260 with passages 272 extending along interface surface 270 and outer radial surface 271. In addition to frame 242, fairing 246, outer radial casing 248, second outer radial casing 249, outer radial platform 254, annular mount 260, and finger seal 261, FIG. 5A shows fasteners 264 (only on is shown in FIG. 5A), first cavity 266A, second cavity 266B, and secondary flow 268. FIGS. 5A and 5B show a portion of annular mount 260 which comprises a seal land finger seal 261. Annular mount 260 includes first flange 265, second flange 267, interface surface 270, outer radial surface 271, and passages 272. Passages 272 include first channels 274R and second channels 274A.

As shown in FIG. 5A, annular mount 260 is mounted to outer radial casing 248 by fasteners 264. First cavity 266A is disposed between outer radial platform 254 and outer radial casing 248. Second cavity 266B is disposed between aft end of outer radial casing 248 and forward end of second outer radial casing 249. Annular mount 260 and finger seal 261 separate first cavity 266A from second cavity 266B. Secondary air flow 268 travels between outer radial casing 248 and annular mount 260 via passages 272 (FIG. 5B). Thus, secondary air flow 268 travels from first cavity 266A to second cavity 266B.

In FIG. 5B, first flange 265 has an arcuate shape and extends from second flange 267. First flange 265 is contacted by and acts as a seal land for finger seal 261. Second flange 267 also has an arcuate shape and extends radially (as well as circumferentially) with respect to the centerline axis 12 (FIG. 1) of gas turbine engine 10. Second flange 267 includes interface surface 270 and apertures that receive fasteners 264. Passages 272 extend along interface surface 270 and outer radial surface 271.

Passages 272 are comprised of first channels 274R and second channels 274A. First channels 274R extend generally radially along interface surface 270 and second channels 274A extend generally axially along outer radial surface 271. First channels 274R communicate with second channels 274A to allow for the passage of secondary air flow 268.

Interface surface 270 and outer radial surface 271 are adapted to interface with and generally conform to the shape of the aft end of outer radial casing 248. First channels 274R receive secondary air flow 268 and communicate the secondary air flow 268 to second channels 274A. Secondary air flow 268 passes along second channels 274A and exits second channels 274A along outer radial extent of second flange 267.

FIG. 6A shows an enlarged cross-sectional view of another embodiment of annular mounts 360A and 360B mounted to join casings 348A and 348B. FIG. 6B shows a perspective view of annular mount 360B with passages 372 extending along interface surfaces 370A and 370B. FIG. 6A shows fasteners 364 (only on is shown in FIG. 6A), nut 365, first cavity 366A, second cavity 366B, and secondary flow 368. FIGS. 6A and 6B show a portion of annular mount 360B which comprises a mount feature for attaching casing 348B to casing 348A. Annular mount 360 includes first flange 365AA, shoulder 367A, second flange 367BB, first interface surface 370A, second interface surface 370B, mounting apertures 371B, and passages 372. Passages 372 include first channels 374A and second channels 374R.

As shown in FIG. 6A, annular mounts 360A and 360B are configured to abut one another and join first casing 348A to second casing 348B using fasteners 364. First cavity 366A is disposed radially inward of first and second casings 348A and 348B. Second cavity 366B is disposed radially outward of first and second casings 348A and 348B. First and second casings 348A and 348B separate first cavity 366A from second cavity 366B. Secondary air flow 368 travels between first casing 348A and second casing 348B via passages 372 (FIG. 6B). Thus, secondary air flow 368 travels from first cavity 366A to second cavity 366B.

In FIG. 6B, first flange 365AA has an arcuate shape and is integrally joined to second casing 348B. Second flange 367BB also has an arcuate shape and extends radially from first flange 365AA. Shoulder 367A receives and interfaces with the inner diameter portion of first annular mount 348A. Shoulder 367A includes first interface surface 370A while second flange 367BB includes second interface surface 370B and mounting apertures 371B. Passages 372 extend along first interface surface 370A and second interface surface 370B. Mounting apertures 371B extend through second flange 367BB and are interposed between passages 372. Mounting apertures 371B are adapted to receive fasteners 364 (FIG. 6A) to mount second annular mount 360B to first annular mount 360A.

Passages 372 are comprised of first channels 374A and second channels 374R. First channels 374A extend generally axially along first interface surface 370A of projection 361B and second channels 374R extend generally radially along second interface surface 370B. First channels 374A communicate with second channels 374R to allow for the passage of secondary air flow 368.

First interface surface 370A and second interface surface 370B are adapted to interface with and generally conform to the shape of first annular mount 360A. First channels 374A receive secondary air flow 368 and communicate the secondary air flow 368 to second channels 374R. Secondary air flow 368 passes along second channels 374R and exits second channels 374R along an outer radial extent of second flange 367BB.

Passages 372 allow for air flow between first cavity 366A and second cavity 366B. Thus, first cavity 366A and second cavity 366B can be purged with a continuous air flow. Additionally, passages 72 allow air flow to film cool the abutting surfaces of first casing 348A and second casing 348B. Providing film cooling increases the operation life of first and second casings 348A and 348B.

FIG. 6C shows a perspective view of another embodiment of annular mount 460B that can be used with first annular mount 360A of FIG. 6A. Annular mount 460B has passages 472 extending diagonally along interface surface 470B. FIG. 6C shows a portion of annular mount 460B which comprises a mount feature for casing 448B. Annular mount 460 includes first flange 465AA, shoulder 467A, second flange 467BB, first interface surface 470A, second interface surface 470B, mounting apertures 471B, and passages 472. Passages 472 include first channels 474A and second channels 474R.

Annular mount 460B is shaped in a manner identical to annular mount 360B of FIG. 6B save for channels 474R extend diagonally along second interface surface 470B rather than only generally radially. The diagonal shape of channels 474R imparts a both radial and lateral movement to secondary air flow that passes through and exits from channels 474R, thus increasing the amount of film cooling at the flange interface.

FIG. 6D shows a perspective view of yet another embodiment of annular mount 560B that can be used with first annular mount 360A of FIG. 6A. Annular mount 560B has passages 572 extending diagonally to intersect with and cross over one another along interface surface 570B. FIG. 6D shows a portion of annular mount 560B which comprises a mount feature for casing 548B. Annular mount 560 includes first flange 565AA, shoulder 567A, second flange 567BB, first interface surface 570A, second interface surface 570B, mounting apertures 571B, and passages 572. Passages 572 include first channels 574A and second channels 574R and 574RR.

Annular mount 560B is shaped in a manner identical to annular mount 360B of FIG. 6B save for channels 574R extend diagonally along second interface surface 570B and intersect with and cross over channels 574RR. The shape of channels 574R and 574RR provides for additional surface cooling along the interface of annular mount 560A while additionally imparting a swirl to secondary flow.

The invention discloses the use of annular mounts with channels therealong (and in some embodiments impingement holes) to a direct secondary air flow for purging dead cavities within gas turbine engines. Additionally, the channels in the annular mount can be used to provide a cooling air flow along a surface of a component that the annular mount is mounted to, as well as providing a cooling air to the cavities.

Discussion of Possible Embodiments

The following are non-exclusive descriptions of possible embodiments of the present invention.

An annular mount for a gas turbine engine includes a first flange and a second flange. The first flange has an arcuate shape, and the second flange extends from the first flange. The second flange has an interface surface along at least one side and has a plurality of mounting apertures extending therethrough. The channels extend along a length of the interface surface from a first edge to a second edge.

The annular mount of the preceding paragraph can optionally include, additionally and/or alternatively, any one or more of the following features, configurations and/or additional components:

a shoulder that extends axially from the second flange, the interface surface extends both radially along the second flange and axially along the shoulder, and each of the channels have an axially extending portion and a radially extending portion;

a casing with a mounting surface that is connected to the second flange, wherein the channels allow for the passage of a secondary gas flow between the annular mount and the mounting surface from the second cavity to the first cavity;

impingement holes that extend through the second flange, wherein at least one of the channels communicate with one or more of the impingement holes;

the annular mount comprises a mount ring;

a first casing adapted with the annular mount on an end thereof, and a second casing mounted to the first casing by the annular mount, and the channels along the interface surface allow for the passage of a secondary gas flow between the first casing and the second casing;

the passages extend both radially and laterally with respect to a centerline axis of the gas turbine engine; and each passage crosses over an adjacent passage as the passage extends radially outward.

An assembly for a gas turbine engine includes a first casing and an annular mount. The first casing has a mounting surface, and the annular mount has a surface that interfaces and mates with the mounting surface. The surface of the annular mount has a plurality of channels extending therealong that allow for the passage of a secondary gas flow between the annular mount and the first casing.

The assembly of the preceding paragraph can optionally include, additionally and/or alternatively, any one or more of the following features, configurations and/or additional components:

the surface has an axially extending portion and a radially extending portion, and the channels have an axially extending portion and a radially extending portion;

impingement holes that extend through the annular mount, and at least one of the channels communicates with one or more of the impingement holes;

the first casing is connected to the annular mount, and a second casing mounted to the first casing by the annular mount, and the channels along the surface of the annular mount allow for the passage of a secondary gas flow between the first casing and the second casing;

the passages extend both radially and laterally with respect to a centerline axis of the gas turbine engine; and each passage crosses over an adjacent passage as the passage extends radially outward.

A turbine section for a gas turbine engine includes a first casing, a fairing, and an annular mount. The first casing extends along the turbine section and has an aft surface. The fairing is disposed within the first casing to form a main gas flow path. The first casing and fairing together form a first cavity disposed forward of the aft surface. The annular mount is disposed at a radial distance from the fairing and has a radially extending flange that interfaces and mates with the aft surface. The flange has a plurality of channels extending along a surface thereof that allow for the passage of a secondary gas flow from the first cavity to a second cavity.

The turbine section of the preceding paragraph can optionally include, additionally and/or alternatively, any one or more of the following features, configurations and/or additional components:

the flange has an axially extending portion, and wherein the channels have an axially extending portion along the extent of the axially extending portion;

one or more passages that extend through the flange, and at least one of the channels communicates with one or more passages;

the first casing is connected to the annular mount, and a second casing is mounted to the first casing by the annular mount, the channels along the surface of the annular mount allow for the passage of a secondary gas flow between the first casing and the second casing;

the annular mount comprises a mount ring that interacts with the fairing; and a seal, and the annular mount comprises a seal land for the seal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An annular mount for a gas turbine engine, comprising:
a first flange having an arcuate shape; and
a second flange extending from the first flange and having an interface surface along at least one side of the second flange, wherein the second flange has a plurality of mounting apertures extending therethrough and a plurality of channels that extend along a length of the interface surface from a first edge to a radially outermost edge of the second flange, wherein a pair of adjacent channels has one of the plurality of mounting apertures disposed therebetween, and wherein the second flange has impingement holes that extend through the second flange, and wherein at least one of the channels communicate with one or more impingement holes.

2. The annular mount of claim 1, further comprising a shoulder that extends axially from the second flange, wherein the interface surface extends both radially along the second flange and axially along the shoulder, and wherein each of the channels have an axially extending portion and a radially extending portion.

3. The annular mount of claim 1, further comprising a first casing with a mounting surface that is connected to the second flange, wherein the channels allow for the passage of a secondary gas flow between the annular mount and the mounting surface from a first cavity to a second cavity, and wherein a radially inner surface of the first casing at least partially defines the first cavity.

4. The annular mount of claim 1, wherein the annular mount comprises a mount ring.

5. The annular mount of claim 1, further comprising:
a first casing adapted with the annular mount on an end thereof; and
a second casing mounted to the first casing by the annular mount, wherein the channels along the interface surface allow for the passage of a secondary gas flow between a first cavity defined at least partially by a radially inner surface of the first casing and a second cavity defined at least partially by the second casing.

6. The annular mount of claim 5, wherein the channels extend both radially and laterally with respect to a centerline axis of the gas turbine engine.

7. The annular mount of claim 6, wherein each channel crosses over an adjacent channel as each channel extends radially outward.

8. An assembly for a gas turbine engine, comprising:
a first casing having a mounting surface; and
an annular mount having a surface that interfaces and mates with the mounting surface, wherein the surface has a plurality of channels extending therealong that allow for the passage of a secondary gas flow between the annular mount and the first casing, and wherein each channel extends along a length of the surface from a radially innermost edge to a radially outermost edge of the surface, and wherein each channel places a first cavity in flow communication with a second cavity;
wherein the annular mount is disposed between the first cavity and the second cavity, and wherein the first and second cavities are partially defined by surfaces of the annular mount, and wherein a radially inner surface of the first casing at least partially defines the first cavity.

9. The assembly of claim 8, wherein the surface has an axially extending portion and a radially extending portion, and wherein the channels have an axially extending portion and a radially extending portion.

10. The assembly of claim 8, further comprising impingement holes that extend through the annular mount, wherein at least one of the channels communicates with impingement holes.

11. The assembly of claim 8, wherein the first casing is connected to the annular mount, and further comprising:
a second casing mounted to the first casing by the annular mount, wherein the channels along the surface of the annular mount allow for the passage of a secondary gas flow between the first casing and the second casing.

12. The assembly of claim 11, wherein the channels extend both radially and laterally with respect to a centerline axis of the gas turbine engine.

13. The assembly of claim 12, wherein each channel crosses over an adjacent channel as each channel extends radially outward.

14. A turbine section for a gas turbine engine, comprising:
a first casing extending along the turbine section and having an aft surface;
a fairing disposed radially inward from the first casing to form a main gas path through which combustion gases can flow, wherein the first casing and fairing together form a first cavity disposed forward of the aft surface; and
an annular mount disposed radially outward from the fairing and having a radially extending flange that interfaces and mates with the aft surface, wherein the flange has a plurality of channels extending along a surface thereof from a first radially innermost edge to a radially outermost edge, each channel allowing for the passage of a secondary gas flow from the first cavity to a second cavity, wherein the annular mount is disposed between the first cavity and the second cavity.

15. The turbine section of claim 14, wherein the flange has an axially extending portion, and wherein the channels have an axially extending portion along the extent of the axially extending portion.

16. The turbine section of claim 14, further comprising one or more passages that extend through the flange, wherein at least one of the channels communicates with one or more passages.

17. The turbine section of claim 14, wherein the first casing is connected to the annular mount, and further comprising:
a second casing mounted to the first casing by the annular mount, wherein the channels along the surface of the annular mount allow for the passage of a secondary gas flow between the first casing and the second casing.

18. The turbine section of claim 14, wherein the annular mount comprises a mount ring that interacts with the fairing.

19. The turbine section of claim 18, further comprising a seal, wherein the annular mount comprises a seal land for the seal.

* * * * *